US006393560B1

(12) United States Patent
Merrill et al.

(10) Patent No.: US 6,393,560 B1
(45) Date of Patent: May 21, 2002

(54) INITIALIZING AND RESTARTING OPERATING SYSTEMS

(75) Inventors: John W. Merrill, Gilbert, AZ (US); Alok Prakash, Beaverton, OR (US); Mark J. Sullivan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/309,178

(22) Filed: May 10, 1999

Related U.S. Application Data

(63) Continuation-in-part of application No. 09/070,419, filed on Apr. 30, 1998, now Pat. No. 6,173,417.

(51) Int. Cl.[7] .......... G06F 9/995
(52) U.S. Cl. .......... 713/2
(58) Field of Search .......... 713/1

(56) References Cited

U.S. PATENT DOCUMENTS 5,089,958 A * 2/1992 Horton et al. .......... 714/5
5,325,532 A * 6/1994 Crosswy et al. .......... 713/2
5,710,930 A * 1/1998 Laney et al. .......... 713/300
6,098,158 A * 8/2000 Lay et al. .......... 711/162
6,101,601 A * 8/2000 Matthews et al. .......... 713/2

* cited by examiner

*Primary Examiner*—Thomas M. Heckler
(74) *Attorney, Agent, or Firm*—Trop, Pruner & Hu, P.C.

(57) ABSTRACT

An operating system may be more efficiently initiated and restarted by making a virtual image of the configuration settings for a base system configuration. These settings may be stored and may be used to quickly initiate the system in its base configuration, for example, using an executive. The base configuration may be automatically modified in response to system hardware or software configuration changes. These changes may be stored with the base configuration information. When a crash occurs, the virtual image may be used to quickly restore the system without the necessity for rebooting the operating system.

19 Claims, 17 Drawing Sheets

22
System Memory
20
At reset time, control is transferred to the OS
Windows Files Registry Etc.
12
Hard Disk Drive
10
New Base Image
16
Special Disk Partition(14)
Base OS Image
18

INITIALIZING AND RESTARTING OPERATING SYSTEMS

CROSS-REFERENCE TO RELATED APPLICATION

This is a continuation-in-part of U.S. patent application Ser. No. 09/070,419 filed on Apr. 30, 1998, now U.S. Pat. No. 6,173,417.

BACKGROUND

This invention relates generally to operating systems and particularly to initializing and restarting those operating systems.

When a computer system is initially turned on, a basic input/output system or "BIOS" begins to operate. The BIOS controls many important functions of the personal computer, such as how it interprets key strokes, how it puts characters on the screen, and how it communicates with other devices. The BIOS typically instructs the computer to test itself every time the user turns the computer on. To do this, the BIOS uses a power on self test or "POST".

When the personal computer starts, it typically first enters what is called the "real mode". The computer accesses a special memory location holding program instructions including a jump instruction pointing to the BIOS code. Initially, the BIOS instructs the system microprocessor to run through components of the system and determine whether they are operating properly. Next, any expansion boards which have been installed are checked, and thereafter, the microprocessor begins the actual bootup process. During the bootup process, the BIOS code may instruct the microprocessor to jump to a section of code instructing the microprocessor how to read the first sector of the system floppy, hard disk or CD-ROM drive. The microprocessor then loads the operating system to start actual computer operations.

The Windows® operating system is perhaps the most common operating system used in personal computers. It is an "open" system in that it is adaptable to different computer systems and it is adaptable to changing hardware on any given computer system. At least, in part, due to this openness, it takes a considerable amount of time for the Windows® operating system to start up. To some users, this delay may be an annoyance and, in some instances, the start up process may interfere with the way a system operates.

Current computer systems have some capabilities to speed the initiation of the computer system. For example, it is known to use a "fast on" capability which bypasses all or part of the POST routine. Similarly, some laptop computers have a suspend/resume operation. When desired, the user can press a suspend button and all the settings on the computer are stored. When the computer powers up thereafter, the computer recognizes that a suspend had occurred and immediately resumes operations exactly where the computer left off before. In addition, some computer systems work in an "always on" mode whereby it is never necessary, absent a problem, to reboot the computer system. Some simple computer systems, such as personal digital assistants (PDAs), use what is known as a Real Time Operating System (RTOS) to allow the computer to start quickly.

In a number of cases, computer system users are beginning to investigate the possibility of using other operating systems in addition to the Windows® operating system. For example, the BeOS operating system is advantageous in some circumstances. Similarly the Linux operating system is attracting increasing attention for a number of applications. While a majority of the available application software is only operable on the Windows® operating system, users may desire to use other operating systems in those situations in which other operating systems are advantageous. Currently, there is no simple way to do this other than to simply load a first operating system, use the first operating system and then when it is desired to use a second operating system to reboot the second operating system. This complexity may be a reason why many users stay with only one operating system.

SUMMARY

In accordance with one aspect of the present invention, a method of enabling a computer system to run programs written for two different operating systems includes executing a first operating system. Information about the current state of the first operating system is stored to enable reinitialization. A second operating system is executed and the first operating system is reinitialized using the stored information.

DETAILED DESCRIPTION

Figure 1:
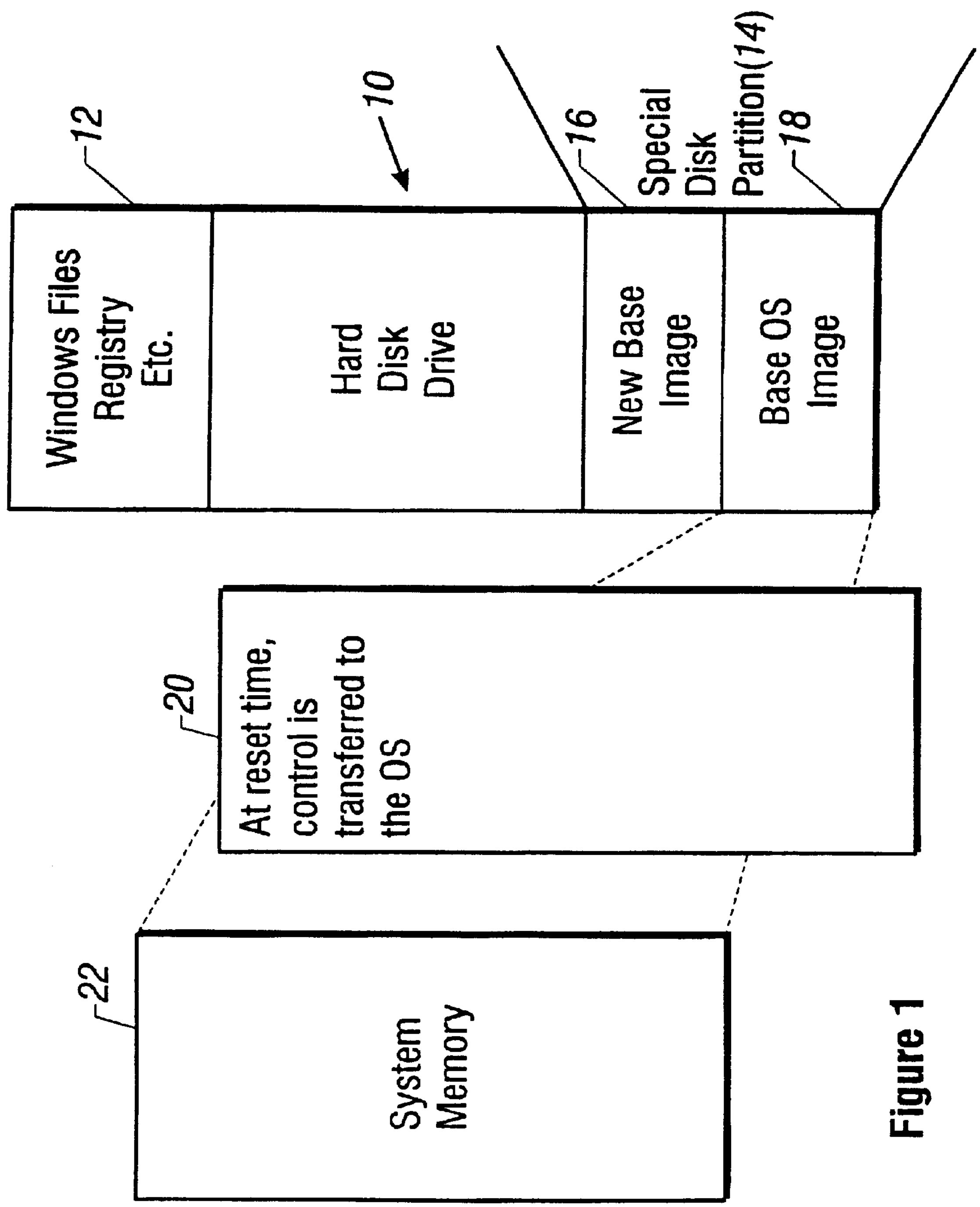
FIG. 1 is a diagrammatic depiction of one embodiment of the present invention.

Referring to FIG. 1, a hard disk drive 10, may store a number of files for an operating system such as the Windows® operating system. Typical files 12 would be user files, registry files and other operating system files. A special disk partition 14 provides an area for a new base image 16 and a base operating system image 18.

The base operating system image 18 may be a stored virtual image which may have been preloaded at an originating computer manufacturing facility. The image captures a system configuration for a base computer system with a predefined set of hardware and software configuration parameters. These parameters may be applicable to a particular computer as it is originally configured or it may be a hypothetical set of configurations which may or may not correspond precisely to the configuration of the computer. The base operating system image 18 may, for example, include initial register settings, device settings, base memory page files and the like. In short, it includes everything that is loaded into memory at run time including dedicated applications and a user shell.

Basically, the image includes all the necessary parameters for an operating system, such as the Windows® operating system, to operate an actual or hypothetical computer configuration. It corresponds to the information about the registers and memory which is developed during the operating system bootup sequence for the predefined base computer configuration. Thus, the image is effectively a virtual image of the operating system after bootup with the predefined characteristics, analogous to a configuration snapshot. The image 18 includes information about the memory and registers of an actual or hypothetical base machine after bootup time.

At startup, the information contained in the special disk partition 14 is transferred, as indicated by block 20, into system memory 22. In this way, it is not necessary to undergo the normal operating system bootup operation, because that function has, in effect, been preaccomplished for the base configuration. As a result, it is possible to more quickly begin the operating system operation.

Particularly with open operating systems such as the Windows® operating system, the bootup time may be substantial because of the number of configurations that must be investigated and recorded. In one illustrative embodiment, the file associated with the virtual image may be a relatively large file. For example, in a system with a large number of different hardware and software configuration settings, the image may have a relatively large amount of data. Therefore, it may desirable to use very low level functions to encode the file which may be read very quickly. Thus, the initiation time for a system such as the Windows® operating system may be reduced from a time period on the order of a minute or so to a time on the order of seconds with current transfer rates from hard disks.

An example of the operation of one illustrative embodiment could involve a set top personal computer operating a television tuner and a video game in a screen within a screen display. If it becomes necessary to restart the system, it would be desirable for the transition to occur seamlessly. Namely, it would be desirable that the system restart without the user noticing a significant change in either the video game or the television picture.

By transferring an image of the operating system to system memory quickly, and obtaining current settings, both displays could be maintained. The current setting information might include the applications (e.g., the video game, the score in the game, the television tuner, and the channel setting).

This image could be loaded much more quickly than would be required to restart an open operating system for the computer. By transferring the image and the software to implement the image, the system can be started quickly without interfering in a significant way in the user's expectations.

Referring again to FIG. 1, the special disk partition 14 also includes a new base image 16. The image 16 may be recorded after the computer system software or hardware configuration changes. The computer system may be adapted to automatically store these changes in the memory space 16 so that whenever it is necessary to restart or reinitialize the operating system, the operating system can be quickly re-initialized, taking into consideration the new software and hardware configuration.

This approach is substantially different from that used in current open operating systems. Because these systems are open systems, they begin by querying all the settings and configurations each time the system is restarted or reinitiated. This takes some time but insures that a large number of variations can be accounted for without requiring different operating systems for different circumstances. The approach shown in FIG. 1 works in essentially the opposite fashion. It records an initial virtual image in a non-volatile storage medium, such as hard disk drive, and then readjusts that image as necessary thereafter. Thus, in some embodiments, the image may be essentially permanently stored, even if in some cases the stored image may be altered from time to time. In effect, it makes an assumption about a base configuration, records that image to avoid the need for an elaborate bootup sequence, and then modifies that image as necessary as the computer system evolves.

Figure 2:
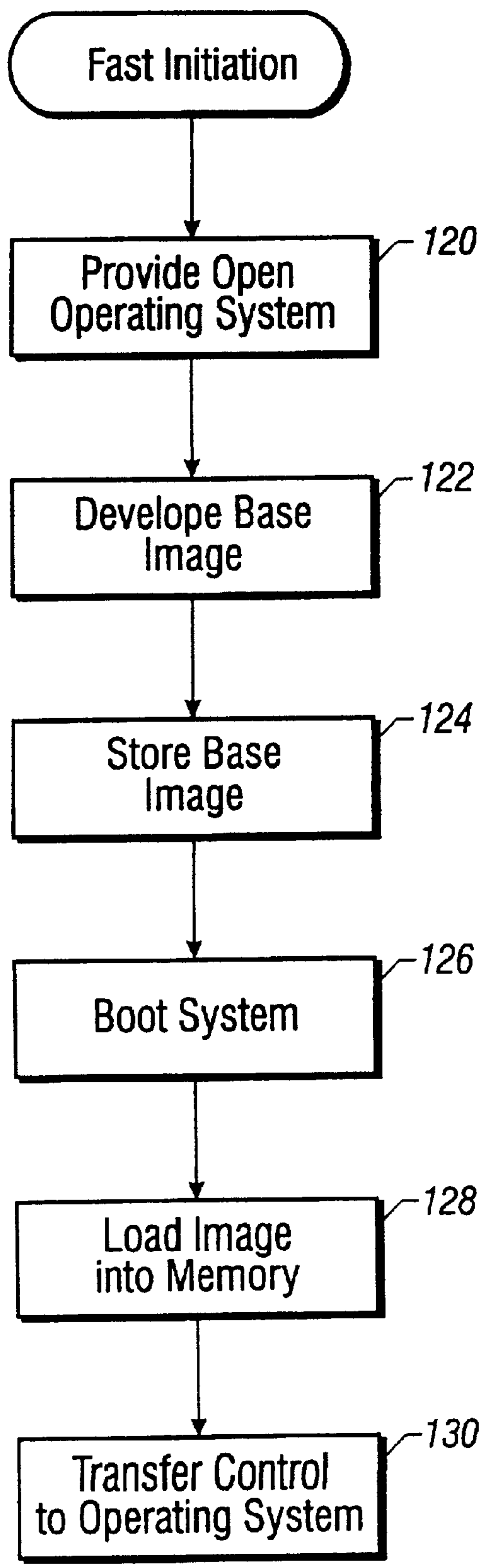
FIG. 2 is a flow diagram for a fast initiation program.

A flow for a fast initiation program in accordance with one embodiment of the invention, shown in FIG. 2, begins by providing an open operating system, as indicated at block 120. Thereafter, a base image is developed as described herein and the base image is stored, as shown in blocks 122 and 124. After the system has booted (block 126), the image is loaded into memory (block 128). Control is then transferred to the operating system, as indicated at block 130.

Figure 3:
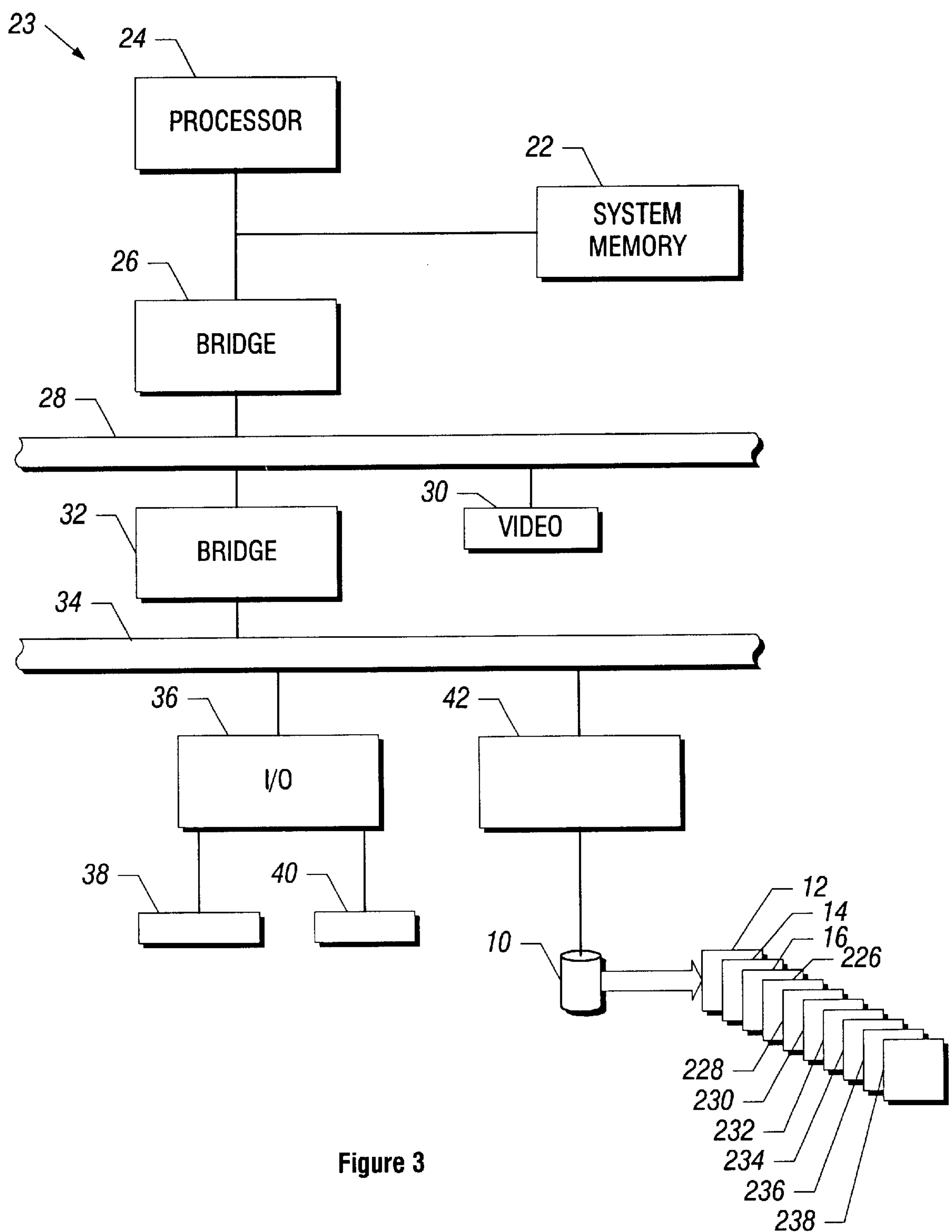
FIG. 3 is a block diagram showing the computer system which could implement the embodiment of the present invention shown in FIG. 1.

A computer system 23, shown in FIG. 3, in accordance with one embodiment of the present invention includes a processor 24 connected to system memory 22. The processor 24 and system memory 22 may be coupled by a bridge 26 to a bus 28. The bus 28 may be any conventional bus used in computer systems. In the illustrated embodiment, video devices 30, such as a TV tuner or a monitor, may be connected to the bus 28. A second bridge 32 is also connected between the bus 28 and another bus 34. The bus 34 may be any conventional bus. In the illustrated embodiment, an input/output interface 36 couples to the bus 34 and to a mouse 40 and keyboard 38. Similarly, an interface 42 connects a hard drive 10 containing the files 12, 16 and 18 described previously and the files 226, 228, 230, 232, 234 and 236 to be described later. Also, the hard disk drive may store the software shown in FIGS. 2, 5, and 7 to 14.

Other computer systems may be initiated or restarted using the images 16 and 18, including those utilized as set top personal computers. Those devices could have the same general configuration described above, but might have devices for providing more video functions 30, for example. The set top personal computers include a modem for internet connections, and accept a bus such as a Universal Serial Bus (USB), for connecting desirable peripherals such as a keyboard, floppy or CD-ROM drives and the like. They conventionally use a television set as a monitor.

Figure 4:
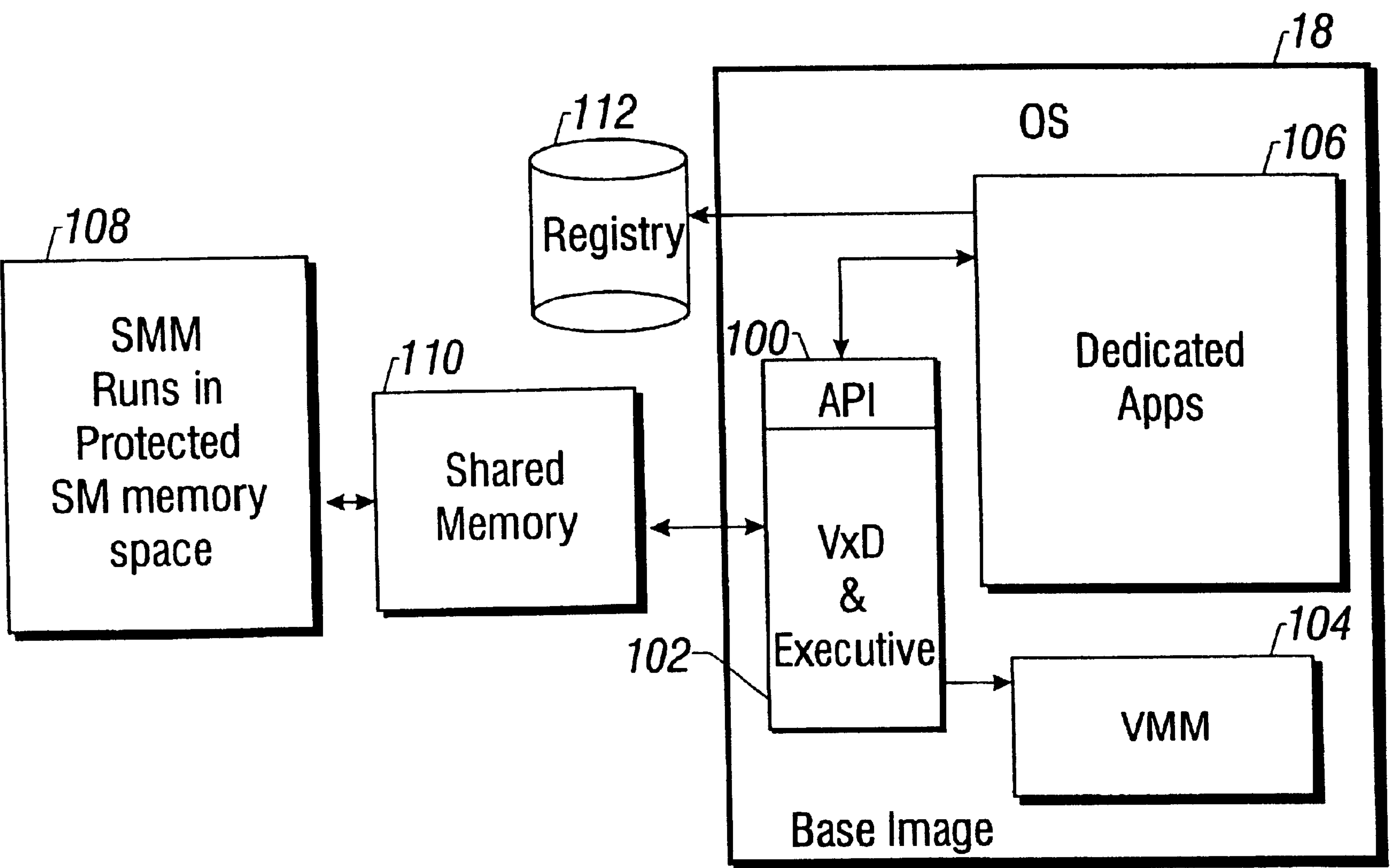
FIG. 4 is a more detailed diagrammatic depiction of the base operating system image shown in FIG. 1.

Referring now to FIG. 4, the base image 18 includes an application program interface (API) 100 and a V×D and executive 102. The V×D API 100 may, for example, be the device I/O control API provided with the Windows® 32 bit operating systems.

The API 100 initiates the V×D 102, causing the V×D 102 to create the base image 18 or the new image 16.

The dedicated applications 106 are important program applications. For example, in a set top personal computer, the application programs responsible for digital television function may be important program applications. These dedicated applications 106 may be loaded with the image 16 or 18, the API 100 and the V×D and executive 102.

The virtual machine manager (VMM) 104 is a manager available on 32 bit Windows® operating systems. The V×D 102 can query the VMM 104 for application status information. For example, the V×D 102 can use the VMM 104 to determine if there was a crash. A VMM command can be hooked to determine if a general protection violation or program error indication has been issued, indicating that a crash was detected.

The registry 112 is a status database, such as the Windows® registry. The registry 112 is not part of the image 16 or 18 but it provides the latest information on hardware and software configurations. It is used by the image 18 to bring the system back (after a crash) with all the settings that existed just before the crash. In other words, when the system is restored, the latest settings can be recalled using information obtained by the dedicated applications 106 from the registry 112. For example, in a set top personal computer application, the television channel that was being viewed when the crash occurred can be obtained from the registry 112.

The shared memory 110 allows the base image 18 to communicate with the system management mode (SMM) memory 108. As indicated in FIG. 4, the SMM runs in protected system management memory space. This space exists at ring 0 and is very protected. Therefore, the V×D and the executive 102 may not directly access the SMM memory 108. A shared memory 110 is accessed by the V×D 102. Advantageously, the shared memory 110 may be unknown to the operating system, such as the Windows® operating system. When the shared memory 110 is not mapped to the operating system, the operating system can not access it. However, the V×D 102 can access the memory 110 to allow communications between the system management mode memory 108 and the V×D and executive 102.

Figure 5:
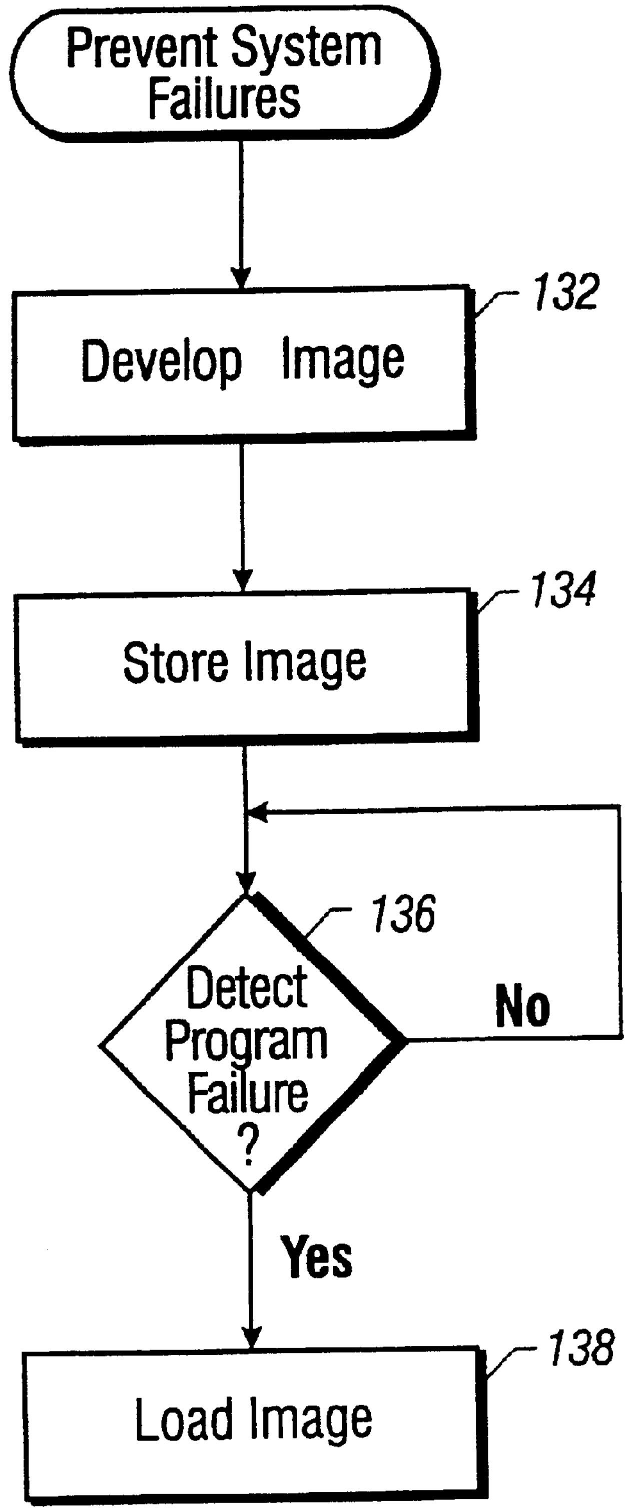
FIG. 5 is a flow diagram for a program to prevent a system failure.

One program for preventing system failure, shown in FIG. 5, begins by developing an image of a base configuration, as indicated in block 132. The image is stored (block 134). When a program failure is detected (diamond 136), the image is loaded (block 138).

Figure 6:
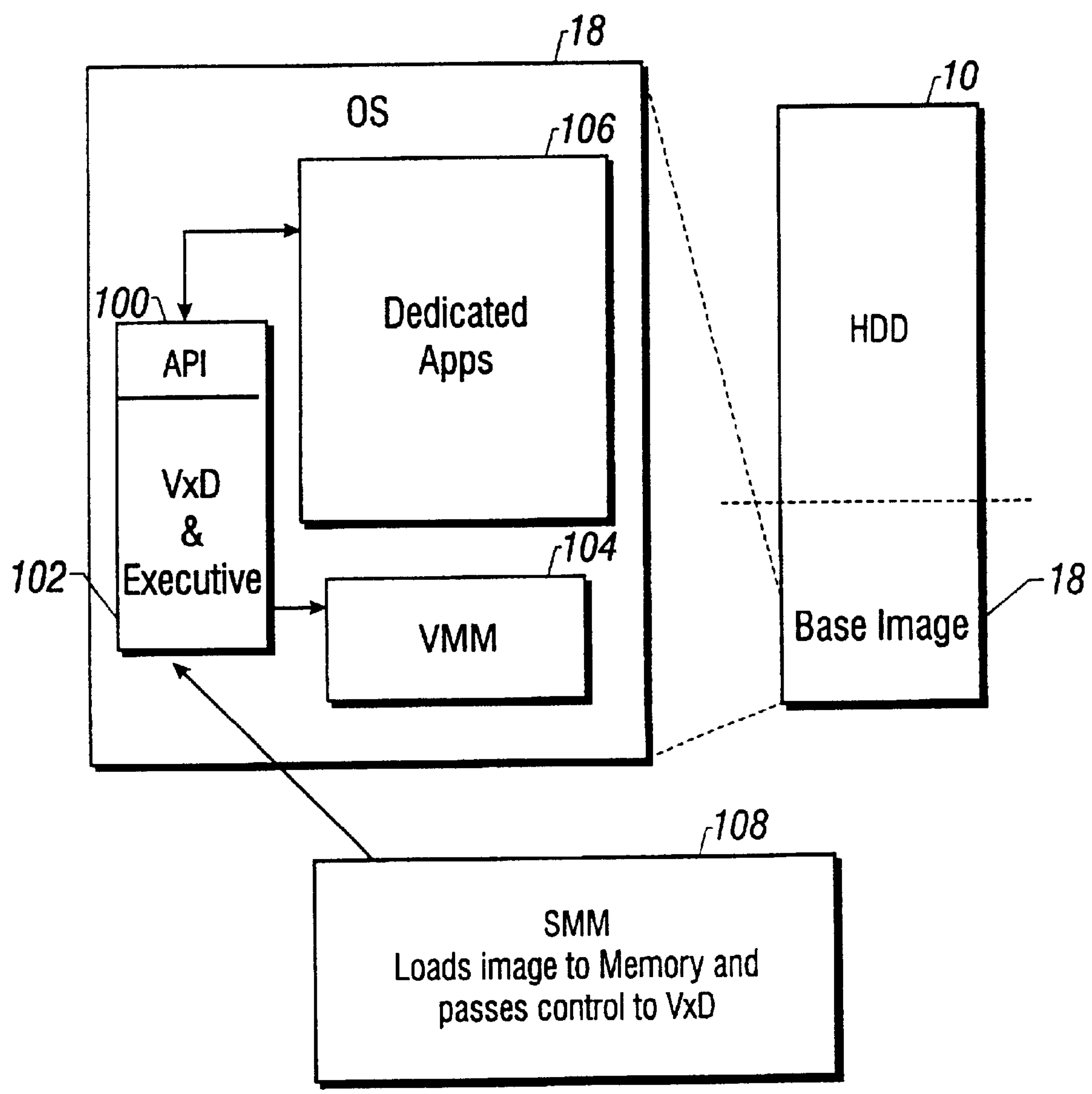
FIG. 6 is a schematic depiction of how the base image is created and utilized.

Referring now to FIG. 6, the image 16 or 18 is created by the executive 102. The V×D and executive 102 are called at a point where the dedicated applications and the user shell are loaded and ready to query the V×D API 100 for a wakeup signal. The image may include the complete memory state of the machine including hardware registers of the processor and devices, together with some system files. The image may be created at the computer manufacturing plant but new images can be created by making the same V×D call, for example, when the system configuration is changed. For example, if a new dedicated application were added, it would be desirable to store a new image.

When it is desired to restore the image, the SMM loads the image into system memory 22 and passes control to the V×D 102 as indicated at block 108. The V×D 102 completes the restore and then returns from the entry in the API 100 where it was called. The dedicated applications 106 are then ready for use and allowed to continue to run. They each query the V×D and executive 102 through the API 100, as indicated by the arrows "A", learn that they are awake and retrieve their configuration states. Thus, to the user the dedicated applications appear to run seamlessly, appearing virtually uninterrupted in the same state they were in prior to the crash.

In effect, the V×D is able to supplement or extend the functionalities of the kernel level of the Windows® operating system. Of course this same functionality can also be written into the operating system kernel if one has access to the operating system kernel.

By using the V×D, a desired functionality can be added to existing operating system kernels.

Figure 7:
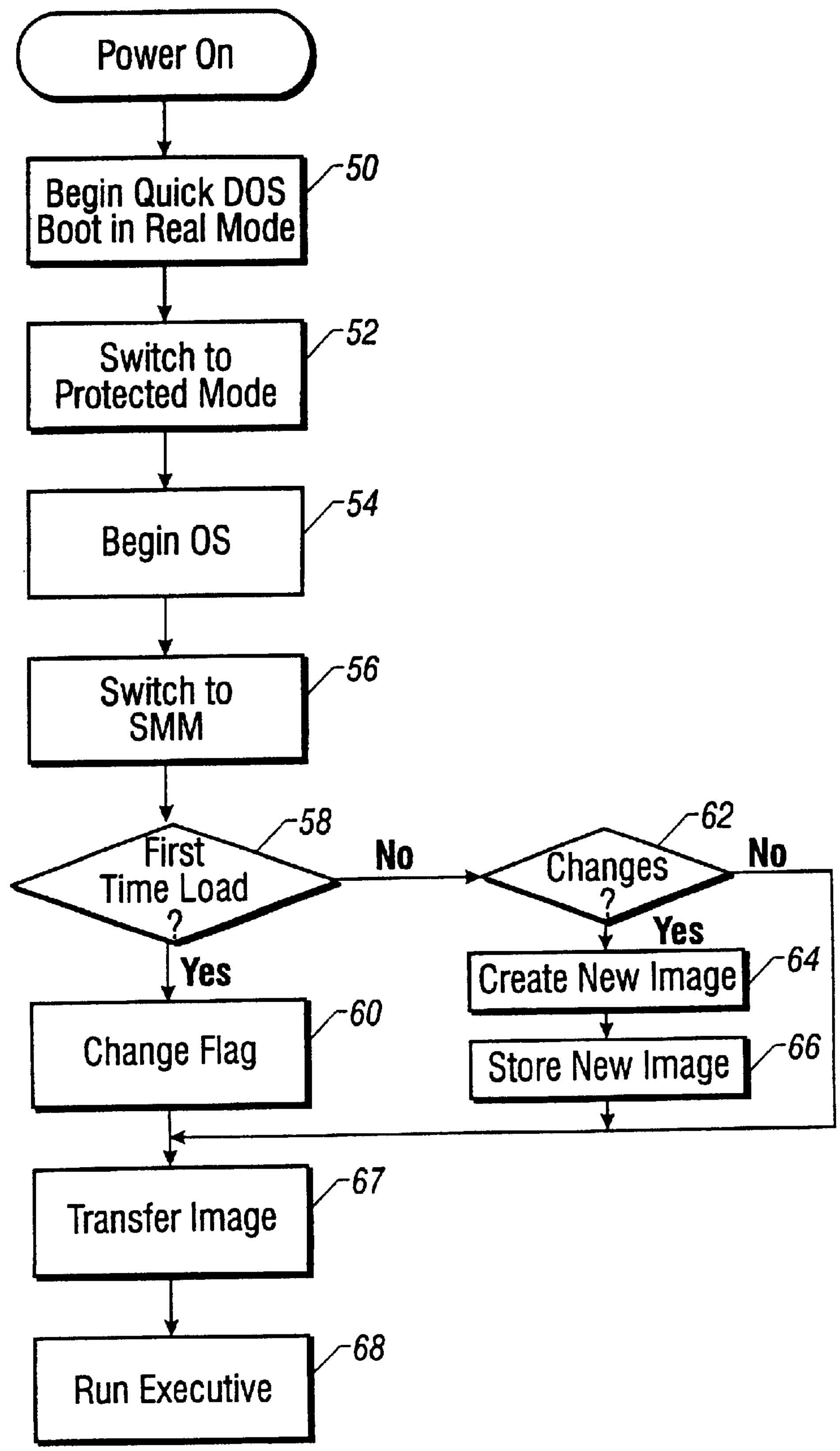
FIG. 7 is a flow diagram showing the initiation of an operating system in accordance with one embodiment of the present invention.

The use of the virtual image in connection with operating system initiation, illustrated in FIG. 7, may begin in certain embodiments, after the DOS (Disk Operating System) bootup has been completed. If desired, an abbreviated DOS bootup sequence may be initiated by removing a variety of operations which are not essential. For example, all or part of the POST routine may be eliminated. As indicated at block 50, the initiation sequence begins with a quick DOS bootup in real mode. At block 52, the bootup sequence switches to the protected mode and the DOS bootup sequence is continued.

At block 54, the operating system initiation sequence begins. Initially, as indicated at step 56, the sequence may switch to the system management mode (SMM). The use of the system management mode may be desirable. because it operates in a very protected address space. Moreover, the SMM continues to operate despite a number of relatively serious system errors.

Next, the operating system initiation sequence checks to determine whether this is the first time that the operating system has been initiated, as indicated in diamond 58. If so, a first time load flag is changed so that next time the system will know it is not the first time that the operating system has been initiated (see block 60).

If it is not the first time that the operating system is loaded, a check is undertaken of a configuration database at diamond 62 to determine whether there have been any changes to the computer configuration from the base configuration. One way to implement this function is to set a flag whenever the system reboots. The check at block 62 can then determine whether the flag indicates a reboot has occurred suggesting a new base image should be developed. If the flag is not set, the flow jumps down and the executive 102 is run (block 68). If changes have been made, a new base image is created at 64 and stored at 66. The stored image is then transferred to system memory 22 (block 67) and the executive is run (block 68).

The real time executive 102 does scheduling, loads programs and runs those programs together. It includes some, but not all of the functionalities of a Real Time Operating System (RTOS). An RTOS may also, for example, manage external devices. Thus, an RTOS includes an executive.

The real time executive 102 runs at ring 0 underneath other more visible operations. It is used to allow extension of the operating system kernel which, since it is preprogrammed, may not be amenable (after the fact) to the functionality described herein. However, the executive functionality could be incorporated into the kernel in developing a new operating system. The executive then implements the operating system functionality using the special disk partition 14.

The provision of the virtual image is useful not only at initiation but also in the variety of circumstances which may require restarting of the operating system. The most important is a program error or crash. A crash is a program error caused by hardware or software problems. A program may crash in response to an exception, an infinite loop, a race condition, a resource shortage or a memory violation.

Normally, when an application crashes, the user powers the system down and restarts the system hoping to thereby overcome the problem. Similarly, when the user is unable to deal with a given situation, the user may simply restart the computer system to see if this overcomes the problem. In either case, through the use of the virtual image, it is possible to quickly and efficiently overcome these problems in a seamless way. It is a seamless solution in that the user may have little or no appreciation of what actually happened and may never have to actually take any corrective action.

Figure 8:
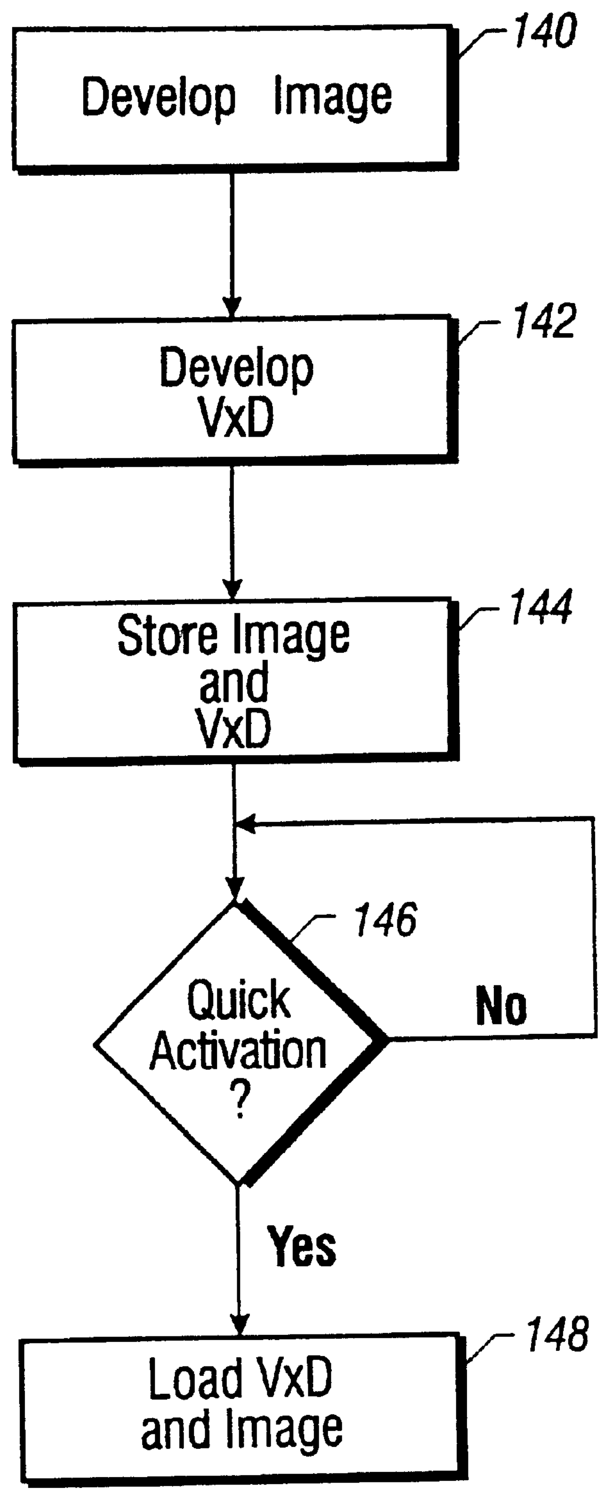
FIG. 8 is a flow diagram of another embodiment corresponding to FIG. 2.

An example of a software program for implementing the above described program, shown in FIG. 8, includes the step of developing an image of a base system configuration (block 140). Next, a virtual device driver is developed, as indicated in block 142, and the image developed in block 140 and the virtual device driver developed in block 142 are stored, as indicated in block 144. If quick activation is desired, the image and the virtual device driver are loaded, as indicated in blocks 146 and 148.

Figure 9:
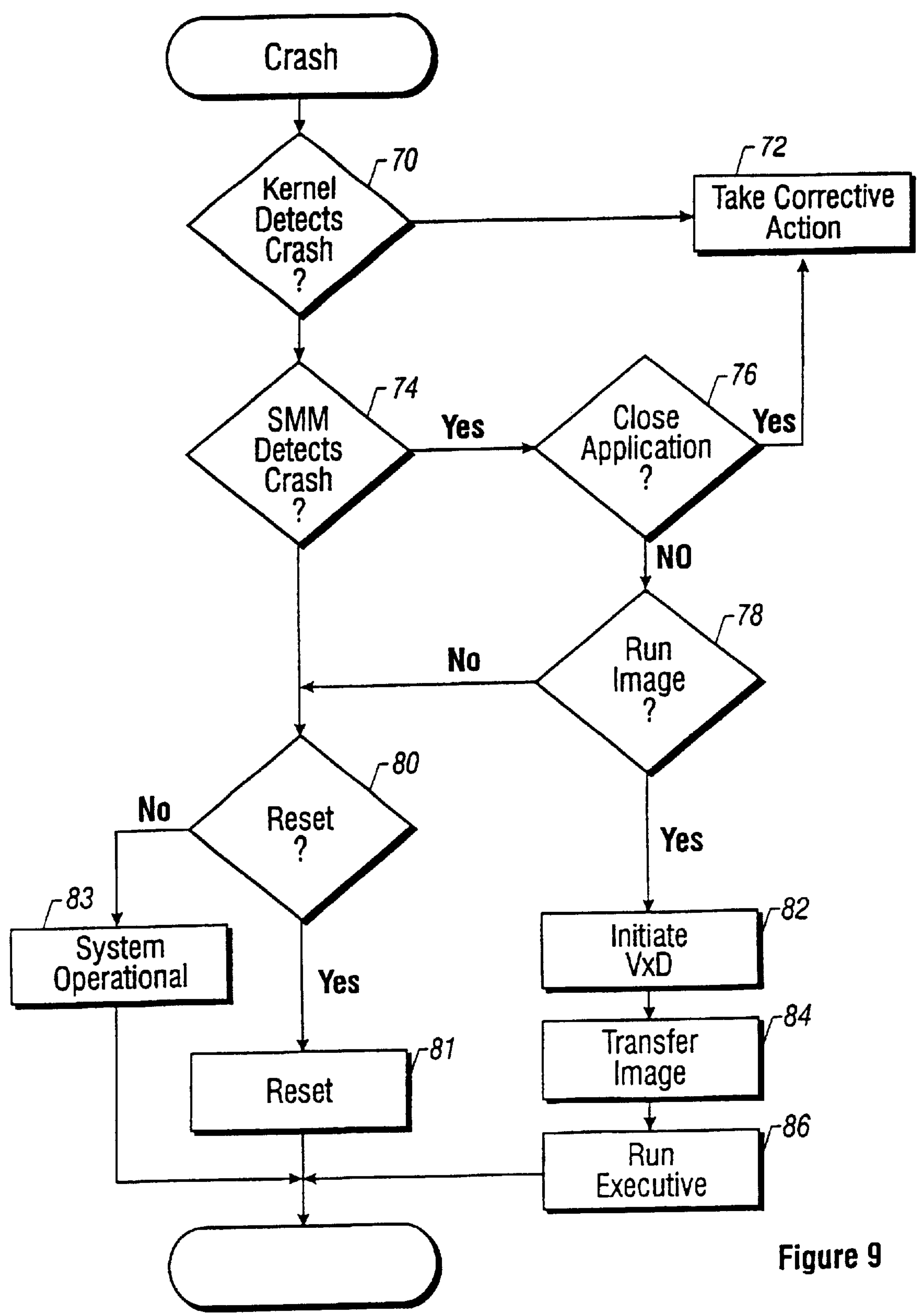
FIG. 9 is a flow diagram showing the operation of one embodiment of the present invention after a program crash.

Referring to FIG. 9, the kernel determines, at diamond 70, whether or not there is a crash. If the kernel is operating and determines that there has been a crash, the kernel can take corrective action, as indicated at block 72. If the kernel is not operating or has not detected the crash, a check is made at diamond 74 to determine whether the system management mode has detected the crash.

The system management mode monitors for a number of different crash circumstances and routinely detects a variety of different failures. Other detectors of system failure can be used as well including those variously described as heart beat monitors, watch dog timers, and crash detectors. In each case the systems detect some symptom of failure such as a hang, a lack of bus operations or some other symptom associated with a crash.

If a crash is detected at diamond 74, either by the system management mode or some other way, a check is made at diamond 76 to determine whether or not it would be possible to overcome the problem merely by closing the application. If so, the application is merely closed at block 72. The system management mode or other crash detector may have a cache which provides information about different failures which may occur. The cache, which may be stored on the hard disk drive 10, provides information about the best way to deal with those failures. If the failure is one in which the problem can be overcome merely by closing the application, it would normally be desirable to undertake that approach.

If the recorded cache information suggests it is not possible merely to close the application, a check is made at diamond 78 to; determine whether or not the executive should be run. Again, the cache is checked to determine whether or not the use of the virtual image will overcome the problem. If not, the flow moves to a reset 80 and the system is reset in the conventional fashion. If the cache information indicates that the virtual image could be used to overcome the problem, the V×D is initiated, as indicated at block 82. Thereafter, the virtual image is called at block 84 and the executive takes over control at 86. The executive brings the system up using the predefined virtual image, as originally loaded into the system, or as modified as described previously, to accommodate changed system configurations.

Thus, the virtual image of a base or new base image may not only expedite the initiation of the operating system but may also provide a useful tool for crash handling. In addition, in many applications, including the set top personal computer, the virtual image can accommodate normal computer operations in a way which creates a seamless impression to the user. Namely, the user may never notice the time delay involved in initiation or, after most crash circumstances, the user may be effectively shielded from some adverse consequences of the crash. For example, in set top personal computers, the crash may not affect the normal television picture because it is handled quickly.

Figure 10:
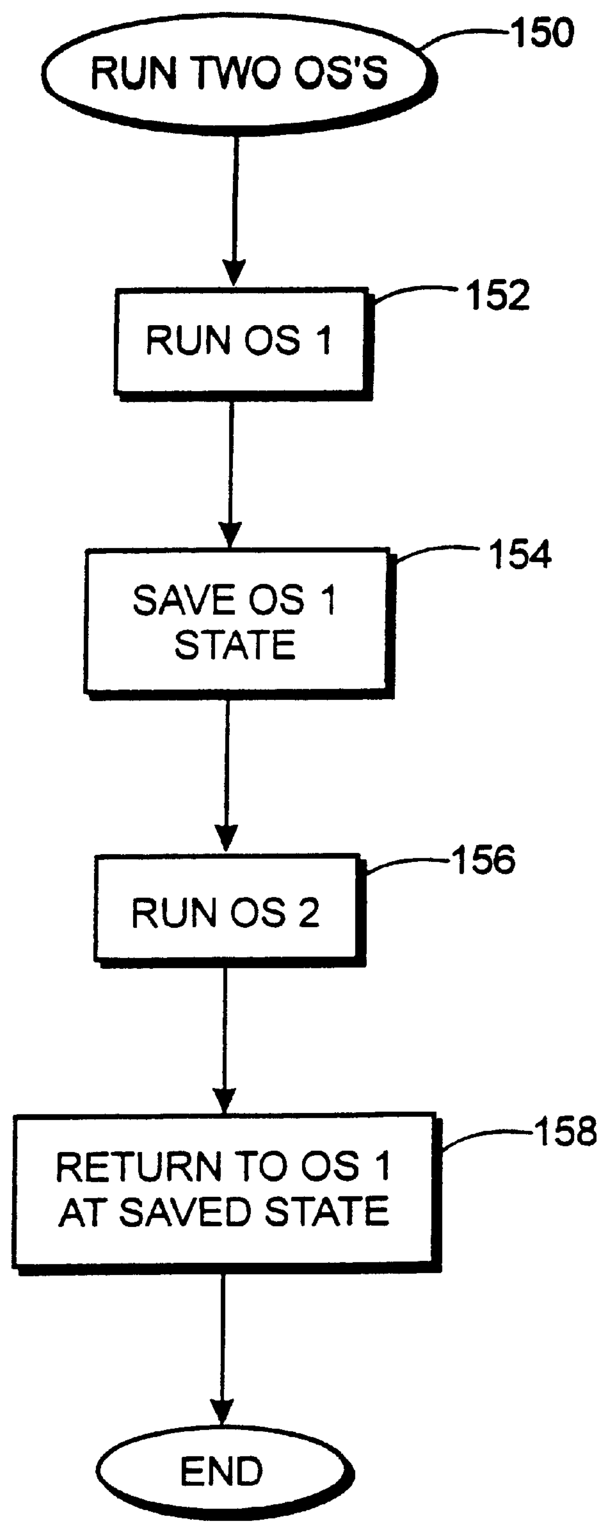
FIG. 10 is a flow chart showing one embodiment of the present invention applied to running more than one operating system on a single computer.

FIG. 10 indicates that the software 150 for allowing a given computer system to run two different operating systems, as desired by the user, begins by running a first operating system as indicated in block 152. When it is desired to switch to the second operating system, the image of the first operating system may be saved as indicated at block 154. In some cases, less than the entire corresponding image may be saved. For example, a number of driver states may be saved to facilitate the return to the original operating system in those systems where it is not possible, or for some reason, is not desirable, to preserve an image.

Thereafter, the second operating system may be run as indicated in block 156. This operating system may be accessed in a variety of different fashions, examples of which will be described in more detail hereinafter. When it is desired to return to the original operating system, as indicated in block 158, the saved information or the saved image is used to reinitialize the original operating system without requiring rebooting.

Thus, it can be appreciated that embodiments of the present invention enable two operating systems to be utilized without requiring rebooting when switching between the two operating systems. In some embodiments this enhances the desirability of using two operating systems. Moreover, in some embodiments it may quicken and facilitate the return to the original operating system after operating a second operating system.

Figure 11:
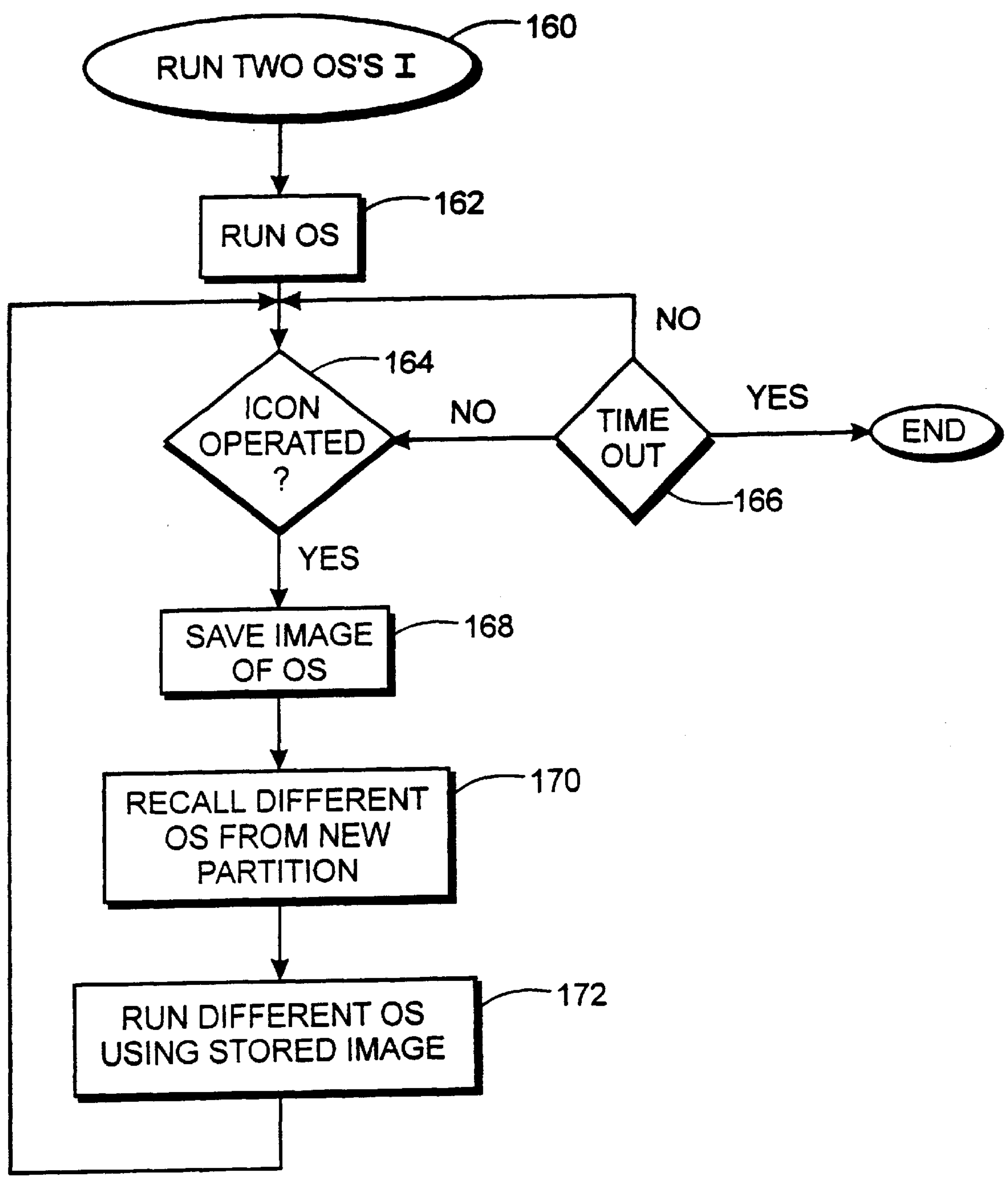
FIG. 11 is an additional embodiment of software for running more than one operating system.

Referring now to FIG. 11, one embodiment of software 160 for implementing two operating systems on a single computer is illustrated. Initially, a first operating system is run as indicated in block 162. At diamond 164 an inquiry determines whether an icon has been operated. An icon may be a graphical user interface indicative of a second operating system. The user can select the second operating system in any conventional way including clicking on an icon associated with the second operating system. If no such input command is received, a check at diamond 166 determines whether a timer has timed out indicating that no such information has been received after a sufficient period of time. In such case, the flow may end. Otherwise, the system continues to wait for the request for a second operating system.

When the request to initiate a second operating system is received, as determined at diamond 164, the image of the original operating system may be automatically saved (block 168) in one embodiment of the present invention. This image may be sufficient to reinitiate the original operating system at the exact state where it was operating previously, before switching to the new operating system. Next, a second operating system may be recalled (block 170), for example, from a different partition on a hard disk drive. That is, the second operating system may be maintained at its own partition in the hard disk drive so that it may be separately recalled by the software 160.

The second operating system is then run (block 172). If the second operating system has previously been run, it can be initialized using the stored image. Otherwise, it may be initialized using an image stored in association with the second operating system in a base configuration. That is, if the operating system had been operated previously, it can be reinitialized automatically to its last known state using the stored image. If this is the first time that the operating system is operated, it may be initialized from a base image without the need to reboot, even the first time the operating system is initiated, in some embodiments of the present invention.

Figure 15:
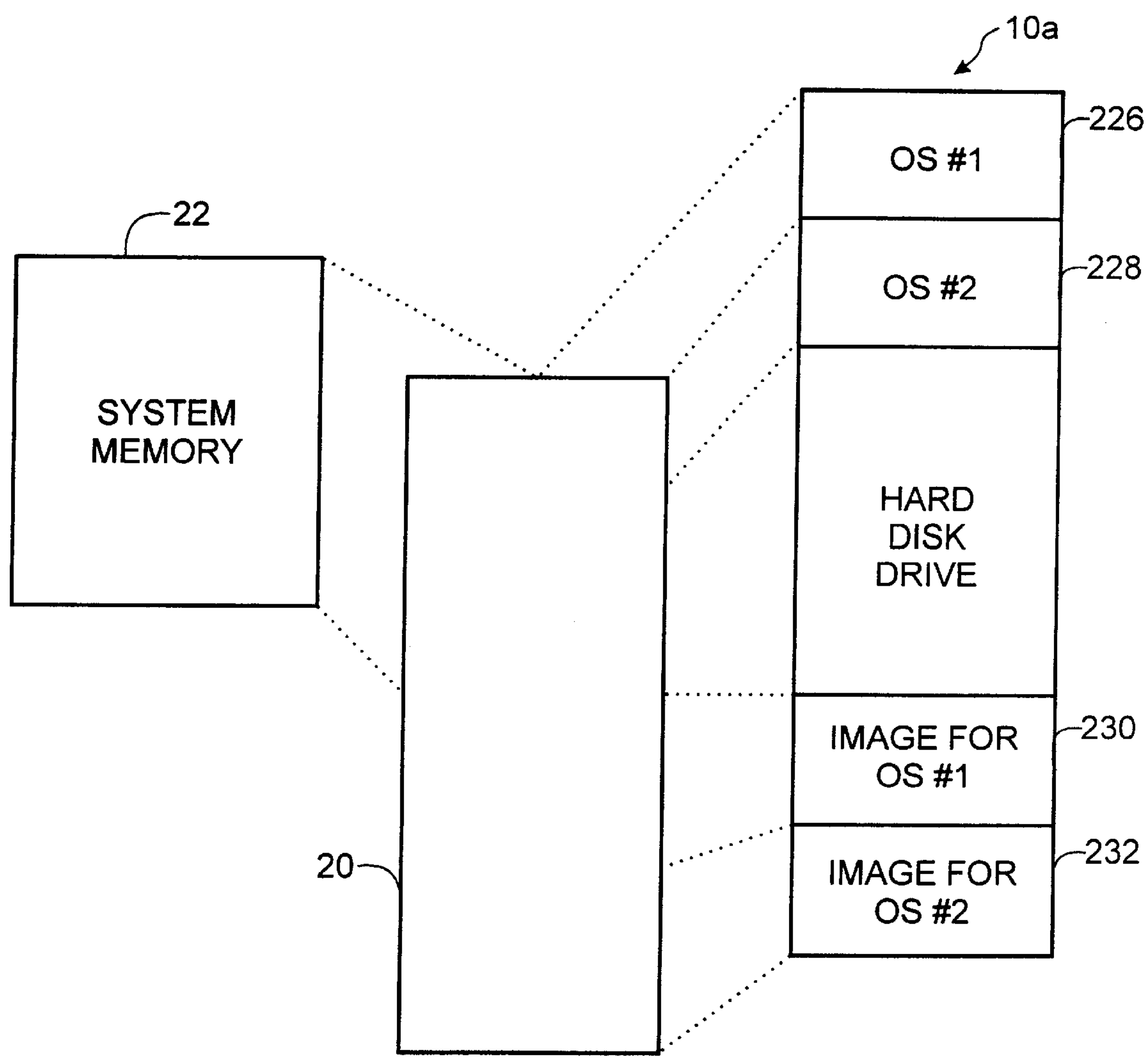
FIG. 15 is a schematic depiction of how images may be stored for different operating systems.

Thus, as indicated in FIG. 15, the hard disk drive 10*a* may store a pair of operating systems 226 and 228 as well as images 230 and 232 associated with each operating system. Stored information on the hard disk drive may be transferred as indicated in block 20 to system memory 22.

Figure 12:
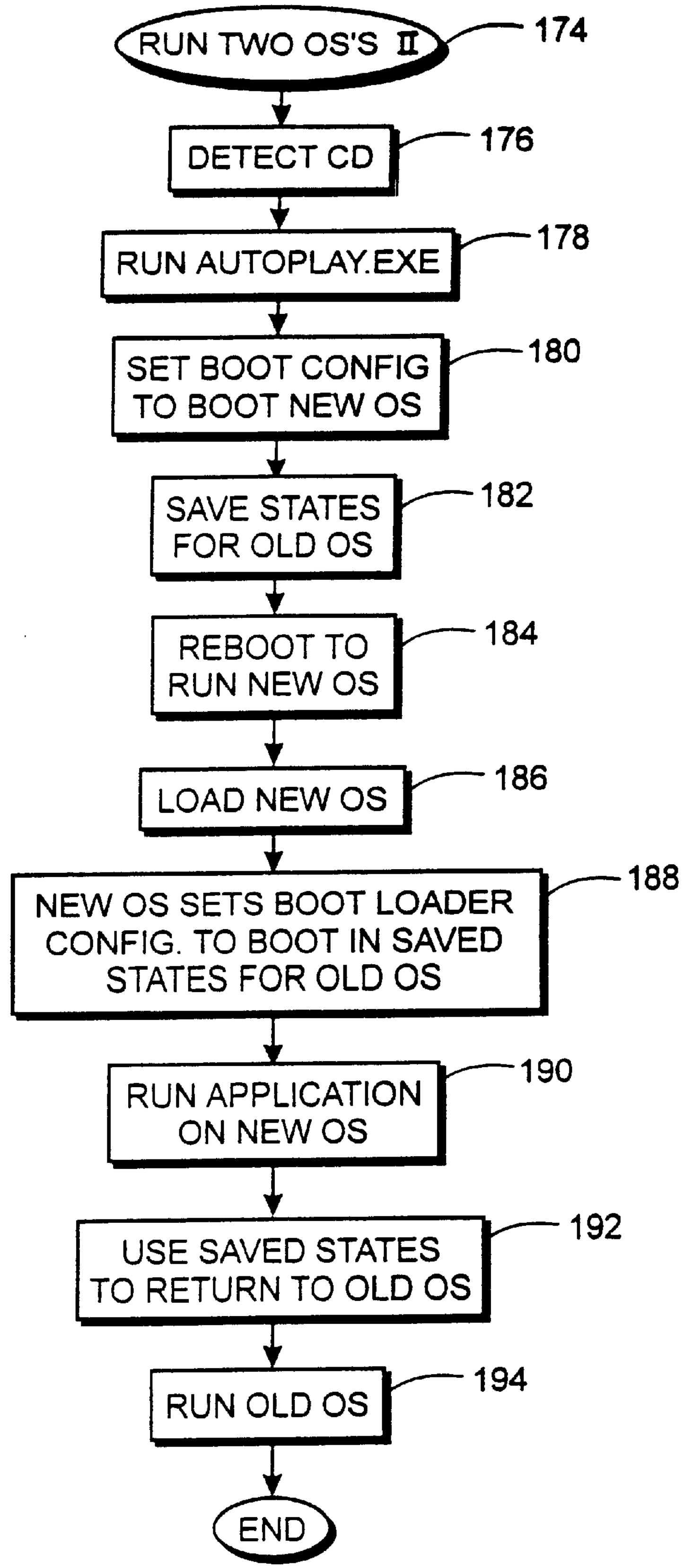
FIG. 12 is still another embodiment of software for running more than one operating system.

Another embodiment of a system for operating two operating systems, shown in FIG. 12, uses the software 174. In this case, the software, at block 176, detects a compact disk ("CD") which has been put into a CD player. In this case, the presence of the disk indicates a desire to initialize a second operating system. For example, the BeOS operating system, available from Be, Inc., Menlo Park, Calif. 94025 normally is initialized in this fashion. Other operating systems can also be initialized in this fashion. Alternatively, other known techniques for initiating software may be used.

Once the second operating system disk is detected, a software routine (called autoplay.exe in the example) is run, as indicated in block 178. This software routine sets the boot configuration to boot the new operating system, as indicated in block 180. In addition, the states for the old operating system may automatically be saved (block 182). This may mean that driver contexts are saved in a simple system or, if desired, an operating image, as described previously, may be saved for the old operating system.

The system is then able to reboot the new operating system as indicated in block 184. In some embodiments, this step may not be necessary, for example as described previously in connection with FIG. 11. The new operating system is loaded as indicated in block 186 using the boot loader. Thereafter, the new operating system sets the boot loader configuration to boot the next time into the saved state or the saved image which was saved in block 182, as indicated in block 188. Thus, when the old operating system is resumed, a rebooting operation may not be necessary. Either a partial rebooting may be utilized or, if preferred, the system may be reinitialized without rebooting.

New application programs may then be run on the new operating system as indicated in block 190. When it is desired to return to the old operating system, the saved states may be recalled to facilitate the return to the old operating system. The system may be returned automatically to the old operating system (block 192) at the state which existed at the time of the transition to the new operating system. In a case where an image is stored, the system may be resumed to the exact condition that it was in prior to the transition. Thereafter, the old operating system may be run without rebooting as indicated in block 194.

A number of computer systems have what is known as safe mode. By providing a safe mode with a reduced number of boot sequence parameters, the likelihood of returning to a useful operating state is increased. If something goes wrong in the boot sequence, and if that particular item which went wrong is eliminated in the safe mode boot sequence, the system can be booted successfully. Normally, if there is a problem booting, the user can abort, go to the disk operating system (DOS) which is part of the Windows® operating system, load a limited set of drivers including basic screen drivers and the system will boot. Thus, the safe mode facilitates operation of the system when something is wrong. Of course, if the system calls for a safe mode boot sequence and the problem exists in the safe mode sequence, the system will still fail to boot.

Figure 13:
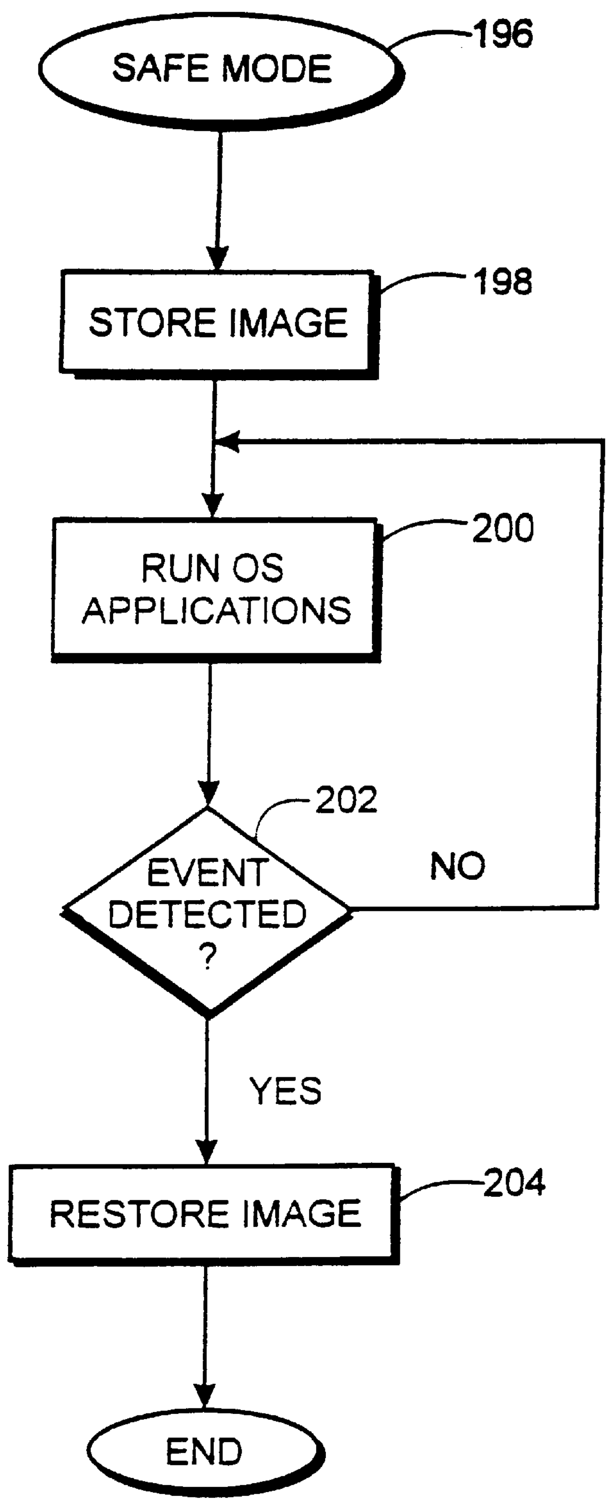
FIG. 13 is a flow chart for implementing a safe mode in connection with one embodiment of the present invention.

These problems may be overcome by using an image of a base configuration of the system to implement a safe mode. Referring to FIG. 13, safe mode software 196, in one embodiment of the invention, begins by storing an image as indicated in block 198. The first operating system is run with any desired applications as indicated in block 200. When a given event is detected which gives rise to concerns about the ability of the system to operate effectively, the image may be restored as indicated in block 204. If no such event is detected, the system just continues to run normally.

In existing safe mode systems, the drivers are stored which must be then loaded and initialized. By using an image, the driver does not need to be loaded or initialized. The image may be created in the factory in some embodiments and may be well tested. Thus, in some embodiments the image may provide a high level of confidence that the system will operate properly. In this way, the image may provide a starting point for diagnosis of any faults that occur. By being able to ensure that the system can return to a known good state, the ability to diagnose errors, without concerns about contamination effects from the fault itself, may speed and facilitate the diagnosis of the errors.

Figure 16:
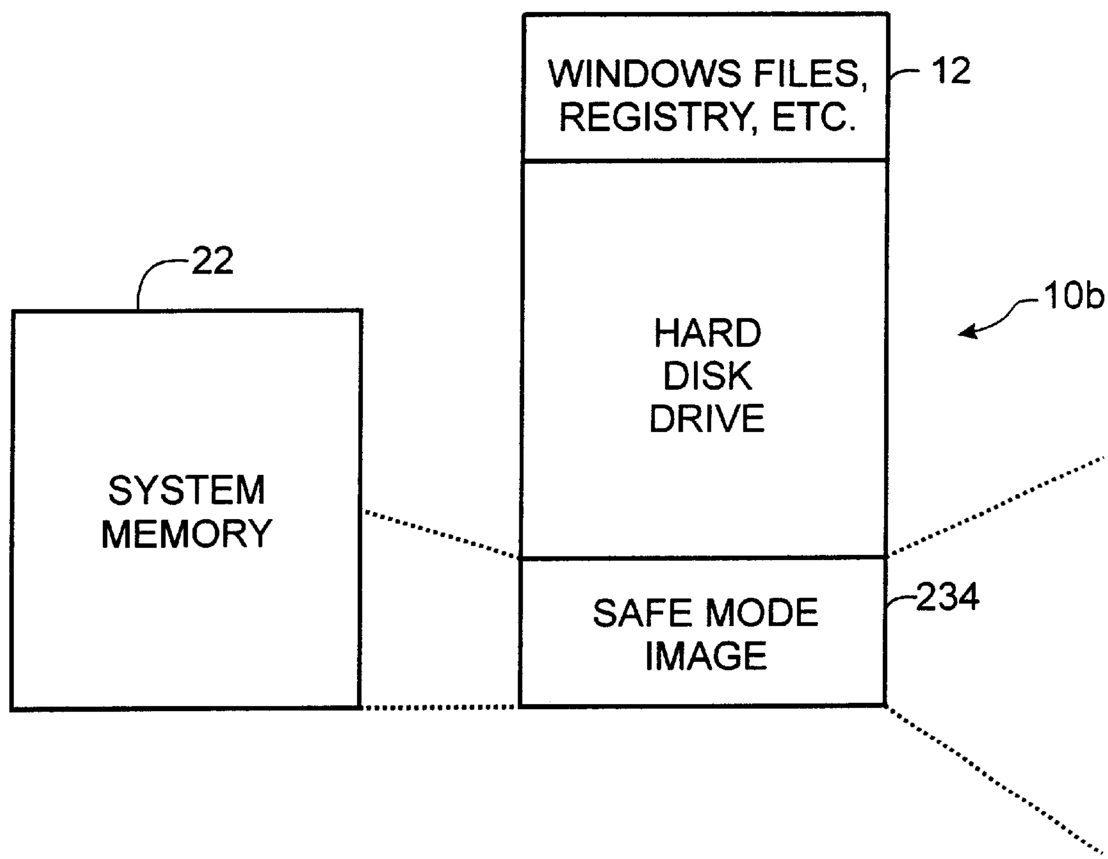
FIG. 16 is a schematic depiction of a stored safe mode image.

Referring to FIG. 16, the safe mode image 234 may be stored on a hard disk drive 10*d* with Windows® files and registry information and the like as indicated at 12. The safe mode image 234 may be transferred to system memory 22 when needed.

A swap file is a hard disk file that an operating system uses as a virtual memory to hold parts of programs and data files that do not fit in memory. The operating system moves data from the swap file to memory as needed. It also moves data out of memory to the swap file to make room for new data.

A swap file may be used to facilitate locating information related to a stored image in the hard disk drive. In using the stored image to restore an operating system, it is possible that the swap file may become contaminated by subsequent events. If this information is overwritten, part of the information needed to restore the image may likewise be lost.

Figure 14:
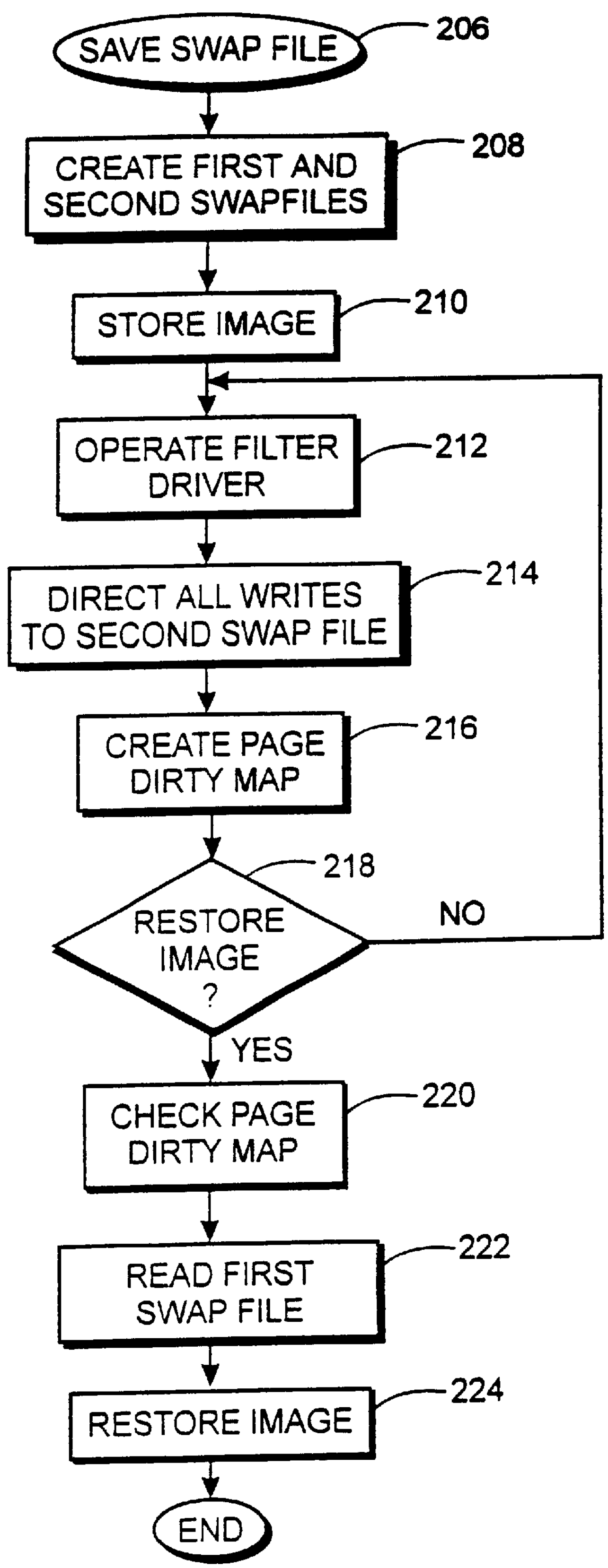
FIG. 14 is a flow chart showing one embodiment of the present invention for ensuring that swap files are available to be used in implementing an image restore.

The potential for loss of such information may be reduced by using the software 206, shown in FIG. 14, which maintains two swap files. In one embodiment of the invention, initially, first and second swap files are created as indicated in block 208. An initial image is then stored in association with the first swap file as indicated at block 210. A filter driver may be added to the operating system kernel, as shown in block 212. The filter driver intercepts all page reads and writes which occur after the image is stored and directs them to the second swap file as shown in block 214. The filter driver keeps a page dirty map which keeps track of all the writes which occur after the first and second swap files are created (block 216). When it is desired to restore the image, as determined in diamond 218, the page dirty map may be checked (block 220) to determine whether to read from the first or second swap file. When it is desired to restore the image, the unchanged first swap file may be utilized. In other cases, when it is desired to get the latest information in the virtual memory (i.e. in situations other than restoring the image), the second swap file is utilized, as determined by the page dirty map.

In order to restore the image, the first swap file is read as indicated in block 222 and then the image may be restored as indicated in block 224. In this way, the filter makes sure that the proper swap file is used, based on whether the swap file was written to before or after the image was stored.

Figure 17:
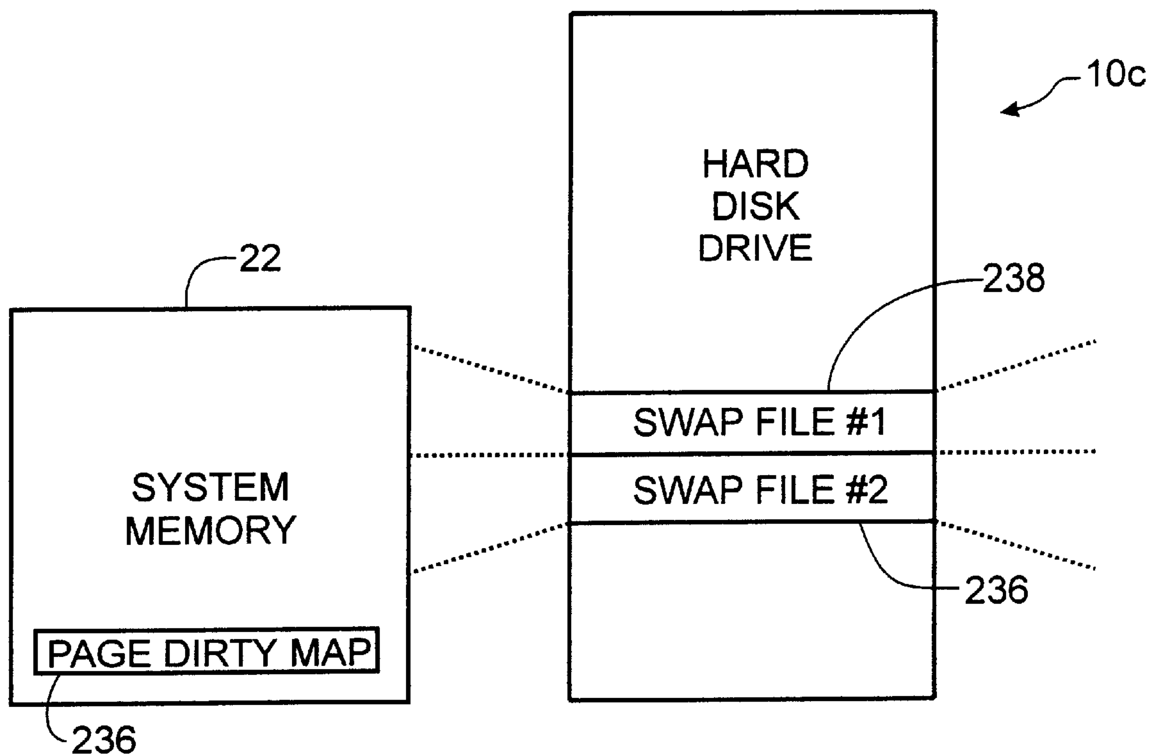
FIG. 17 is a schematic depiction of an embodiment including stored swap files.

Referring to FIG. 17, a pair of swap files 238 and 236 may be stored on the hard disk drive 10*c*. The page dirty map 236 may be active in system memory 22. At other times, the page dirty map may be transferred to the hard disk drive. Thus, a partition in the hard disk drive may store the two different swap files 238 and 236, one of which relates to the stored image and the other of which relates to basic swap file functions for implementing a virtual memory.

While the present invention has been described with respect to a limited number of embodiments, those skilled in the art will appreciate numerous modifications and variations. It is intended that the appended claims cover all such modifications and variations that fall within the true spirit and scope of the present invention.

What is claimed is:

1. A method of enabling a computer system to run programs written for two different operating systems comprising:

executing a first operating system;

storing information about the current state of the first operating system to enable reinitialization;

executing a second operating system; and reinitializing the first operating system using said stored information.

2. The method of claim 1 wherein executing a second operating system includes recognizing a disk in a disk drive, reading said disk, and initializing said second operating system.

3. The method of claim 1 wherein executing a second operating system includes recognizing a user request to initiate the second operating system, initializing said second operating system from a disk partition, and transferring said second operating system into system memory.

4. The method of claim 1 wherein storing information includes storing an image to enable reinitialization without rebooting.

5. The method of claim 4 wherein reinitializing first operating system includes returning the first operating system to the same state that it was in when information about the current state was stored.

6. The method of claim 5 further including executing a first program on the first operating system, storing the current state of the first program, executing a second program on the second operating system and reinitializing the first program using said stored information.

7. The method of claim 6 wherein reinitializing the first operating system further includes reinitializing the first program at the same state it was in when the information was stored.

8. The method of claim 6 further including storing information about the current state of the second program and the second operating system to enable reinitialization of said second program and second operating system without rebooting.

9. An article comprising a computer readable medium for storing instructions that enable a processor-based system to:

execute a first operating system;

store information about the current state of the first operating system to enable reinitialization without rebooting;

execute a second operating system; and reinitialize the first operating system using said stored information.

10. The article of claim 9 storing instructions that cause a processor-based system to recognize a disk in a disk drive, read the disk, and initialize said second operating system.

11. The article of claim 9 storing instructions that cause a processor-based system to recognize a user request to initiate the second operating system, initialize the second operating system from a disk partition, and transfer the second operating system into system memory.

12. The article of claim 9 storing instructions that cause a processor-based system to return the first operating system to the same state that it was in when information about the current state was stored.

13. The article of claim 12 storing instructions that cause a processor-based system to execute a first program on the first operating system, store the current state of the first program, execute a second program on the second operating system and reinitialize the first program using said stored information.

14. The article of claim 13 storing instructions that cause a processor-based system to reinitialize the first program at the same state it was in when the information was stored.

15. The article of claim 13 storing instructions that cause a processor-based system to store information about the current state of the second program and the second operating system to enable reinitialization of said second program and second operating system without rebooting.

16. A system comprising:

a processor to switch between executing a first operating system and a second operating system without rebooting; and a memory storing the first operating system.

17. The system of claim 16 adapted to execute said first operating system, switch to execute said second operating system and then switch back to execute said first operating system without rebooting, reinitializing the first operating system at the state it was in when the system switched to execute said second operating system.

18. The system of claim 16 wherein said second operating system is also stored in said memory.

19. The system of claim 18 including a hard disk drive, each of said operating systems stored in separate partitions on said hard disk drive.

* * * * *